United States Patent
Bulmer et al.

(10) Patent No.: US 8,270,961 B2
(45) Date of Patent: Sep. 18, 2012

(54) METHOD OF CONFIGURING A MOBILE TELEPHONE TO INTERACT WITH EXTERNAL SERVICES

(75) Inventors: Russell Bulmer, London (GB); Graham French, London (GB); Neil Pepper, London (GB); Stephen Rogers, London (GB); Adam Connors, London (GB); Lei Bramley, London (GB); Andrew Tiller, London (GB)

(73) Assignee: Critical Path Data Centre Limited, Cheshire (GB)

( * ) Notice: Subject to any disclaimer, the term of this patent is extended or adjusted under 35 U.S.C. 154(b) by 893 days.

(21) Appl. No.: 12/162,648

(22) PCT Filed: Jan. 26, 2007

(86) PCT No.: PCT/GB2007/000285
§ 371 (c)(1),
(2), (4) Date: Feb. 27, 2009

(87) PCT Pub. No.: WO2007/088333
PCT Pub. Date: Aug. 9, 2007

(65) Prior Publication Data
US 2009/0221269 A1 Sep. 3, 2009

(30) Foreign Application Priority Data
Jan. 31, 2006 (GB) .................................. 0601917.8

(51) Int. Cl.
*H04M 3/00* (2006.01)
(52) U.S. Cl. ..... 455/418; 455/419; 455/420; 455/550.1; 455/410
(58) Field of Classification Search .......... 455/418–420, 455/414.1, 550.1; 709/221, 220, 222, 223
See application file for complete search history.

(56) References Cited

U.S. PATENT DOCUMENTS

| | | | |
|---|---|---|---|
| 6,622,017 B1 * | 9/2003 | Hoffman | 455/419 |
| 2003/0065738 A1 | 4/2003 | Yang et al. | |
| 2005/0164691 A1 * | 7/2005 | Payne | 455/419 |
| 2007/0099658 A1 * | 5/2007 | Borquez et al. | 455/556.2 |

FOREIGN PATENT DOCUMENTS

| | | |
|---|---|---|
| WO | WO 01/63900 | 8/2001 |
| WO | WO 03/032664 | 4/2003 |

OTHER PUBLICATIONS

International Preliminary Report on Patentability, dated Aug. 5, 2008, and Written Opinion issued in corresponding International Application No. PCT/GB2007/000285.
International Search Report issued in priority Application No. PCT/GB2007/000285, Jun. 17, 2008.

* cited by examiner

*Primary Examiner* — Kamran Afshar
*Assistant Examiner* — Dung Lam
(74) *Attorney, Agent, or Firm* — Saul Ewing LLP

(57) ABSTRACT

A mobile telephone can be configured to interact with external services by using a client application on the telephone that interacts with several external services via an intermediary server. The server sends, to the mobile telephone, configuration information to enable or disable defined sets of functionality in the application, the configuration information depending on and appropriate to the particular external service selected on the mobile telephone and being sent automatically to the mobile telephone over-the-air. An implementation of the invention enables a single client application on the mobile telephone to automatically configure features on / off, and modify the terminology used in resources (such as menus, text strings, bitmap images, sounds, sonic effects etc.) depending on the external system or service that the client is connected to via the intermediary server.

22 Claims, 1 Drawing Sheet

Client   Cognima Server   3<sup>rd</sup> part services
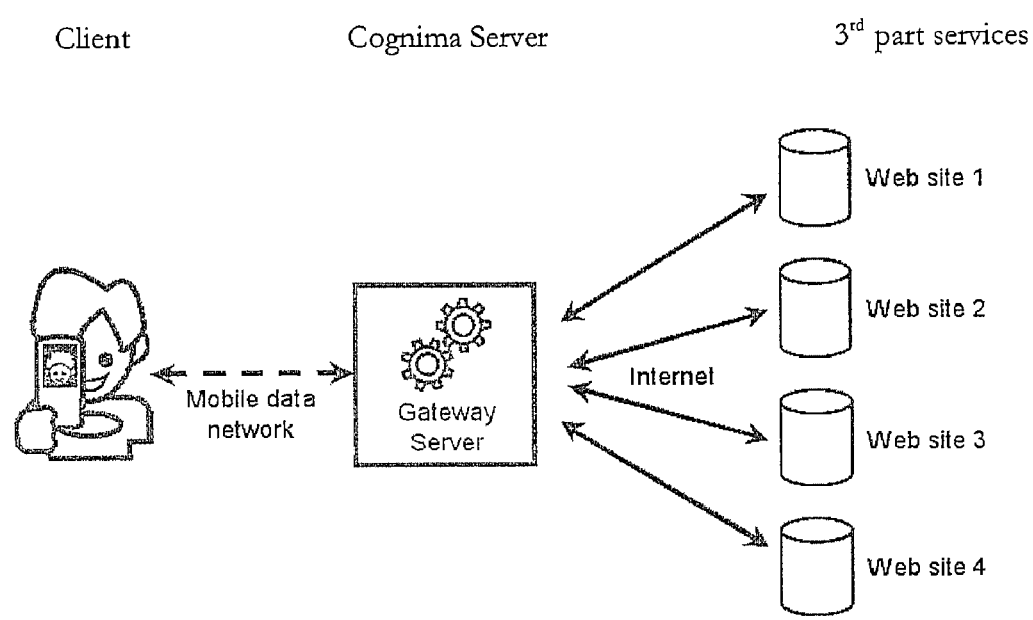

METHOD OF CONFIGURING A MOBILE TELEPHONE TO INTERACT WITH EXTERNAL SERVICES

CROSS REFERENCE TO RELATED APPLICATIONS

This application claims the priority of PCT/GB2007/000285, filed on Jan. 26, 2007, which claims priority to Great Britain Application No. 0601917.8, filed Jan. 31, 2006, the entire contents of which are hereby incorporated in total by reference.

BACKGROUND OF THE INVENTION

1. Field of the Invention

This invention relates to a method of configuring a mobile telephone to interact with external services.

The term 'mobile telephone' used in this patent specification should be expansively construed to cover any kind of device with two way wireless information capabilities and includes without limitation radio telephones, smart phones, communicators, personal computers, computers and application specific devices. It includes devices able to communicate in any manner over any kind of network, such as GSM or UMTS, CDMA and WCDMA mobile radio, Bluetooth, IrDA etc. An external service is an entity or resource (such as a web site) which hosts or receives/supplies information (e.g. text in the case of blogs; images in the case of photo sharing sites; music files in the case of music download sites etc) of interest to a user. These services are generally supplied using servers.

2. Description of the Prior Art

In a given application area (for example, web-based online photo storage, blogging, or digital music downloading) there are many providers of similar services. Each service offering differs slightly in the functionality it supports.

Conventionally, in order to access a particular service (e.g. from a specific company) a mobile telephone would either need to access a specially designed web site via a browser application, or else load and run an application that was specifically tailored to that particular service.

The mobile telephone would generally not be able to access the same service as a PC could—the PC accesses conventional web sites using an HTML browser, but this is inappropriate for a mobile telephone because of the constraints of the mobile environment (including the limited screen size on the phone, the key-pad based data input mechanism, and the high latency and frequent unavailability of the mobile network). Hence, when mobile telephones interact with web-based services, they generally are restricted to a reduced set of functionality available from a WAP site.

It is possible to achieve a better user experience for interacting with a web-based service from a mobile telephone by loading and running on the telephone an application that is specifically tailored to that particular service. For example, if a mobile telephone user wishes to use an existing web-based online photo storage and sharing service like Flickr™ (i.e. a service that is not custom built for mobile telephones, but is a generally accessible web site) then it can download an application, such as ShOZu™ from Cognima Limited, from a remote server to its mobile telephone; once activated on the telephone, the user can upload photographs to the Flickr service from their mobile telephone via a Cognima gateway or intermediary server. The application is specific to Flickr—i.e. it is compatible with the features or functions of Flickr and uses the same terminology as Flickr. The Cognirna gateway plays a critical role in handling all interactions with the web site—it in effect stands as middleware between the mobile telephone and the web site, enabling full interaction between each.

A user could choose a different web-based online photo storage and sharing service like Webshots™; then the application downloaded from the Cognima server to the mobile telephone would be specifically adapted to work with Webshots—it could have different features or functions and use different terminology. The approach of using a gateway to interact with web-based services (hosted on another server) is powerful because it means that a conventional mobile telephone is no longer limited to a small number of WAP services (often controlled by the mobile network operator).

But a conventional PC-based web browsing model still has many effective features—for example, because the web site fully defines the visual and functional interaction, the browser can be entirely generic. For a mobile telephone, using the gateway approach, this has not been possible: the client application on the mobile telephone has to be adapted to a particular service prior to loading onto a mobile telephone. This means that a different client application has been needed for each service, limiting flexibility and choice for the end user. For example, a mobile network operator or handset manufacturer must choose either to install an application in its handsets that supports one particular photo sharing web service, or else install an application with very generic 'lowest common denominator' features that works with a number of web services but gives a sub-optimal user experience.

SUMMARY OF THE INVENTION

The invention is a method of configuring a mobile telephone to interact with external services, in which a client application on the telephone interacts with several external services via an intermediary server;

wherein the server sends to the mobile telephone configuration information to enable or disable defined sets of functionality in the application, the configuration information depending on and appropriate to the particular external service selected on the mobile telephone and being sent automatically to the mobile telephone over-the-air.

External services like photo sharing web sites, use functionality and terminology that are specific to the services they support. For example, some photo sharing web sites also support video files; some allow users to add tags to their images, some refer to tags as "keywords". An implementation of the invention enables a single client application on the mobile telephone to automatically configure features on/off, and modify the terminology used in resources (such as menus, text strings, bitmap images, sounds, sonic effects etc.) depending on the external system or service that the client is connected to via the intermediary server. If this external system/service is changed, the configuration of features and resources in the client is changed dynamically and automatically over-the-air, without requiring an upgrade installation of the client software. Multiple external systems/services can also be supported by the client at the same time; the client then adapts dynamically for all of these. For example, the client can store configuration and resource profiles for several different external systems and automatically switch between them to give the user the impression of seamless and simultaneous handling of all the external systems.

The present invention can hence enable a single client to be configured dynamically, over the air, to use any service from a list of many. Other general types of mobile services that could benefit from this approach include music download services, social networking services, dating services, news & information services, and online shopping services. Each type or class of service has many service providers, each offering slight variations in features and using slightly different terminology. With this invention, it is possible to create a single generic, configurable client application and gateway for each type of service, and have the features and terminology used in the application changed dynamically and over-the-air depending on which particular service provider the phone is connected to via the intermediary server, or gateway.

The single generic/configurable client will be less complex than separate applications, each with their own UI and interaction models. The main advantage is that a network operator or handset manufacturer can install a single, generic, configurable client application in the mobile telephone that will work with many 3rd party services, rather than requiring a separate application per 3rd party service. This means less ROM space devoted to clients, less testing required, and the ability to support new 3rd party services simply by connecting them to the gateway, without requiring the client on the device to be updated (which on many small devices is not possible, at least not without the user sending their device to be modified by the manufacturer).

BRIEF DESCRIPTION OF THE DRAWING

The present invention will be described with reference to FIG. 1, which is a schematic depiction showing a mobile telephone interacting with the gateway over a mobile data network, with the gateway server itself interacting with various web sites, each providing a service.

DETAILED DESCRIPTION

In a given online application area or type (for example online photo sharing, blogging, digital music downloading, social networking, news & information services, online shopping, and dating services . . . ) there are many providers of similar services. Each offering differs slightly in the functionality it supports. This invention allows a generic software application on a mobile telephone to be used with a variety of services, dynamically changing its behaviour and resources to fit the user's choice of service.

The generic mobile telephone application does not need to know about the services that can potentially be accessed. Thus a mobile telephone application may be configured to use a service that did not exist at the time the application was installed on to the mobile telephone. This allows a mobile telephone manufacturer or mobile network operator to install the software application in devices that may sit in the sales channel for months, and still have them able to use the latest services when the mobile telephones are finally sold.

Furthermore, once a mobile telephone application is configured to a given service, the configuration and resources of that service can be kept up to date. Thus if a service adds new functionality, the mobile telephone application can be informed of this and enable the use of that functionality by the user.

User Scenarios

1. Activation

A user signs up for a Cognima service (i.e. signs up to use the gateway server provided by Cognima to access and use various services of a given type, e.g. photo sharing) and chooses which 3rd party service of that type he wishes to use (e.g. Flickr). He downloads a generic, configurable software application to his mobile telephone—for example, either by (1) entering his mobile telephone number onto a form on the web site, which in turn initiates the sending of the application to the mobile telephone, or (2) directly requesting the application from his mobile telephone (e.g. by sending an SMS message and receiving back a download link, or by typing a download link directly into a browser application on the telephone). Alternatively, the application may have been pre-installed on the mobile telephone by the handset manufacturer or network operator. When the user activates the software application on the mobile telephone, the Cognima server uses over the air updates to inform the mobile telephone application of the selected 3rd party service's configuration, and the mobile telephone application automatically reconfigures itself to present the user the correct set of functionality with the correct resources, as defined by the configuration information.

For example, when the application, i.e. the Cognima client, is activated to send photos to a $3^{rd}$ party web site that does not accept video files, video upload features of the client are automatically disabled and made invisible to the end user.

Resources (such as text strings, bitmap images and sounds) used in the client are also configured dynamically over the air. For instance, a client application can attach tags to photos that it sends to a web site. If the end user activates the client to a web site that refers to tags as "keywords", the menus and text strings relating to "tags" in the client application are changed automatically and dynamically (e.g. a menu option labelled "Add tags" becomes "Add keywords").

2. 3rd Party Service Changes

A user is currently using a Cognima service connected to a particular 3rd party system. The 3rd party upgrades its system to support additional functionality. The Cognima server sends updated configuration information to the user's mobile telephone. The mobile telephone application configures itself accordingly, and thus the additional functionality now offered by the 3rd party is available on the user's mobile telephone.

For example, when the Cognima client is activated to send photos to a $3^{rd}$ party web site that does not accept video files, video upload features of the client are automatically disabled and made invisible to the end user. If the $3^{rd}$ party subsequently adds support for video files, then the video upload features in the client are automatically switched on.

3. 3rd Party Branding Change

A user is currently using a Cognima service connected to a particular 3rd party system. The 3rd party re-brands itself, changing its name. The Cognima server sends updated configuration information to the user's mobile telephone application, which reconfigures itself to use and display the new name within the client application. Thus the user's mobile telephone application is kept in step with the 3rd party service.

4. New 3rd Party Service Providers Available via the Gateway

An existing user is informed that new 3rd party services are available from new service providers via the gateway. These services were not available when the user installed the client application on to his mobile telephone. The user chooses one of these new services and switches his Cognima service to use this new 3rd party service. The Cognima server sends down the new configuration information to the user's mobile telephone, and the mobile telephone application reconfigures itself according to the new configuration information. Thus the user's mobile telephone application now presents the correct functionality and resources for the new $3^{rd}$ party service.

How It Works

The system comprises 3 parts: the mobile telephone application (referred to as the Cognima client previously), the Cognima server (referred to as the gateway previously), and 3rd party services. The three parts are schematically depicted in FIG. 1.

The mobile telephone application is a generic, configurable client application for a specific application area or service type. Depending on configuration information sent from the server, defined sets of functionality can be enabled (e.g. shown to the user for his use) or disabled (e.g. hidden from the user so he cannot use it) while the application is running. The system also allows individual resources in the application to be changed by using resources sent from the server instead of the resources in the generic version originally installed on the mobile telephone.

The Cognima server integrates with various 3rd party services to provide their functionality to the mobile telephone application. Each 3rd party service supports some or all of the features available from the mobile telephone application. The server stores information about which functionality each service provides. It also stores the resource patches required for that service. The Cognima server synchronises data from the mobile telephone with the user's selected 3rd party service. For example, photos received by the gateway from the phone are uploaded to the user's account on the selected photo-sharing site. Similarly, comments added to that photo by visitors at the photo sharing web site may be sent down to the mobile telephone via the gateway. Communication between the phone and the gateway uses Cognima's data replication protocol. Communication between the Cognima server and the external system is achieved via direct integration (using an Application Programming Interface). Details of the replication protocol can be found in GB2384589B or US 2005-0021571, the contents of which are incorporated by reference.

The user creates a Cognima account on the Cognima server via a web interface and configures this to connect with one of the 3rd party services—i.e. selects a particular service. The user then installs the mobile telephone application on his mobile telephone and activates it using his Cognima account credentials. (Alternatively, if the application has been pre-installed on the mobile telephone by the handset manufacturer or network operator, the user can create an account on the Cognima server directly from the application on the telephone.) During the activation process, the Cognima server sends configuration information relevant to the selected service and resource patches to the mobile telephone application, using a proprietary protocol (although any suitable protocol could be used). The mobile telephone application then enables and disables functionality as specified by the configuration information, and patches any resources specified. The application automatically configures itself without direct user control or initiation. When the user starts using the application, it is configured to look and behave correctly for the chosen 3rd party service.

If the 3rd party service changes, in terms of supported functionality or resources, the Cognima server automatically sends these changes to the mobile telephone application over the air. The mobile telephone application then automatically enables and disables functionality as required, and patches resources as required, keeping the application looking and behaving correctly for the 3rd party service.

The user can change his choice of 3rd party service by selecting a new service using the Cognima web site. When this is done, the Cognima server, communicating with the Cognima web site, automatically sends the mobile telephone application new configuration information and resource patches over the air. The mobile telephone application enables and disables functionality as required, and patches resources as required, making the application look and behave correctly for the newly selected 3rd party service.

Because the integration to the 3rd party service is done via the Cognima server, the generic client does not need to know the details of the 3rd party service. It just requires the configuration information and resource patches to work with any 3rd party service, including ones that are created after the application is already installed on a user's mobile telephone.

The invention claimed is:

1. A method of configuring a mobile telephone to interact with external service providers, in which a client application adapted for a specific application area or service type and loaded on the telephone, is operable to interact with several different external service providers, each providing a service of the same specific application area or service type via an intermediary server;
wherein the server sends to the mobile telephone configuration information to enable or disable defined sets of functionality in the client application, the configuration information depending on and appropriate to only one of the external service providers and being sent automatically to the mobile telephone over-the-air.

2. The method of claim 1 in which the client application is a generic application suitable for interacting with several different external service providers of the same application area type.

3. The method of claim 1 in which the configuration information enables or disables different menu terminology in the application.

4. The method of claim 1 in which the configuration information enables or disables different text string terminology in the application.

5. The method of claim 1 in which the configuration information enables or disables different screen layouts, fonts, bitmaps or other aspects of the appearance of the application.

6. The method of claim 1 in which the configuration information enables or disables different sounds or sonic effects.

7. The method of claim 1 in which, if a different external service provider is selected on the mobile telephone, then the server automatically sends, over-the-air, configuration information to the mobile telephone that is appropriate to the different external service provider.

8. The method of claim 1 in which, if the selected service provider adds new functionality, then the server automatically sends, over-the-air, configuration information to the mobile telephone that enables the mobile telephone to use that new functionality.

9. The method of claim 1 in which, if the name of the selected service provider is altered, then the server automatically sends, over-the-air, configuration information to the mobile telephone that enables the mobile telephone to use and display that new name for the service provider.

10. The method of claim 1 in which, if the appearance of a web or WAP site for a service provider is altered, then the server automatically sends, over-the-air, configuration information to the mobile telephone that enables the mobile telephone to correctly display the new appearance of the web or WAP site.

11. The method of claim 1 in which each service provider supports some or all of the functions available on the application and the server stores this information.

12. The method of claim 1 in which an end-user connects to the server, configures the server to connect to a selected service provider, and then activates the application, with the configuration information being sent from the server during activation.

13. The method of claim 1 in which resource patches for each service provider are stored by the server and automatically sent by the server to the mobile telephone.

14. The method of claim 1 in which the application area type is online photo storage.

15. The method of claim 1 in which the application area type is blogging.

16. The method of claim 1 in which the application area type is digital music or video download.

17. The method of claim 1 in which the application area type is one of the following: social networking, news and information services, online shopping and dating.

18. The method of claim 1 in which the server integrates with each service provider to provide that service provider's functionality indirectly to the mobile telephone.

19. The method of claim 1 in which multiple external service providers are supported by the client at the same time.

20. The method of claim 19 in which the client application adapts dynamically for all of these service providers.

21. The method of claim 20 in which the client application stores configuration and resource profiles for several different external systems and automatically switches between them to give the user the impression of seamless and simultaneous handling of all the external service providers.

22. A mobile telephone when configured to interact with services according to the method of claim 1.

* * * * *